(12) United States Patent
Iftime et al.

(10) Patent No.: US 7,521,159 B2
(45) Date of Patent: Apr. 21, 2009

(54) MULTICOLOR ELECTRONIC PAPER

(75) Inventors: Gabriel Iftime, Mississauga (CA); Peter M. Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 948 days.

(21) Appl. No.: 11/093,993

(22) Filed: Mar. 30, 2005

(65) Prior Publication Data
US 2006/0222973 A1  Oct. 5, 2006

(51) Int. Cl.
  *G02F 1/13* (2006.01)
(52) U.S. Cl. .............. 430/19; 430/962; 349/1
(58) Field of Classification Search ........... None
See application file for complete search history.

(56) References Cited

U.S. PATENT DOCUMENTS

| | | | |
|---|---|---|---|
| 3,663,650 A | 5/1972 | Scotia | |
| 3,878,263 A | 4/1975 | Martin | |
| 3,961,948 A | 6/1976 | Saeva | |
| 3,994,988 A | 11/1976 | Laurin | |
| 5,604,027 A | 2/1997 | Sheridon | |
| 5,723,204 A | 3/1998 | Stefik | |
| 6,358,655 B1 | 3/2002 | Foucher et al. | |
| 6,365,312 B1 | 4/2002 | Foucher et al. | |
| 6,767,480 B2 | 7/2004 | Iftime et al. | |
| 6,824,708 B2 | 11/2004 | Iftime et al. | |
| 6,849,204 B2 | 2/2005 | Iftime et al. | |
| 2004/0113119 A1 | 6/2004 | Iftime et al. | |
| 2004/0113122 A1 | 6/2004 | Iftime et al. | |
| 2004/0115366 A1 | 6/2004 | Iftime et al. | |
| 2004/0115367 A1 | 6/2004 | Iftime et al. | |
| 2004/0195547 A1 | 10/2004 | Iftime et al. | |
| 2004/0200994 A1 | 10/2004 | Iftime et al. | |

FOREIGN PATENT DOCUMENTS

WO    WO 97/37272    * 10/1997

* cited by examiner

*Primary Examiner*—John A. McPherson
(74) *Attorney, Agent, or Firm*—Pepper Hamilton LLP (57) ABSTRACT

A reimagable medium and a method for "writing" to a reimagable medium are disclosed. The reimagable medium includes a liquid crystal layer, one or more photochromic layers and an electric field generating apparatus. The electric field generating apparatus supplies voltage levels across the liquid crystal layer causing the liquid crystal layer to transfer between a white and a transparent state. The photochromic layers transfer to a colored state when illuminated by ultraviolet light and to a transparent state when illuminated by visible light. Each of the layers maintains their present states when voltage or illumination below corresponding thresholds is supplied. The reimagable medium is flexible and may maintain an image "written" to it until the paper is rewritten. The paper may be attached to a colored substrate if an additional color is to be displayed.

19 Claims, 2 Drawing Sheets

MULTICOLOR ELECTRONIC PAPER

TECHNICAL FIELD

The embodiments disclosed herein relate generally to the field of electronic paper. The disclosed embodiments particularly relates to multicolor electronic paper including a liquid crystal layer and one or more photochromic layers.

BACKGROUND

Many paper documents are promptly discarded after being read. Although paper is inexpensive, the quantity of discarded paper documents is enormous and the disposal of these discarded paper documents raises significant cost and environmental issues. Accordingly, it is desirable to provide, in embodiments, a new medium for containing a desired image and a new image forming method.

To address this issue, it is known to produce reimagable displays based on technologies such as encapsulated electrophoretic particles, multichromal beads, and/or liquid crystals. Examples of such electronic devices, known as electronic paper, are described in U.S. Pat. No. 5,723,204 to Stefik and U.S. Pat. No. 5,604,027 to Sheridon, each of which is incorporated herein by reference in its entirety.

Electronic paper technology uses electric energy to display desired images on display devices. Electronic paper technology is essentially based on electrophoresis, thermal rewritability, liquid crystal conversion and/or electrochromism, and is broadly divided into two categories. The first category uses a display device in which a liquid display element or a liquid containing a solid display element with particles dispersed therein is sealed between a pair of substrates. The other category uses a display device in which electroconductive particles of different colors serving as a display element and insulating particles are sealed between a pair of substrates each having an electrode and a dielectric layer laminated on a support.

Reimagable medias have been previously developed. Typically, such devices include stacked layers capable of showing different colors with cholesteric liquid crystals or Organic Light Emitting Diode (OLED) displays. Each of these technologies are expensive because each layer is filled with the active material under clean-room conditions, the pixels for each layer must overlap in order to properly display information (which requires complicated photolithographic techniques), and each layer requires its own set of electronic drivers.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, is usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for instance, ophthalmic lenses.

U.S. Pat. No. 3,961,948 to Saeva, incorporated herein by reference in its entirety, describes an imaging method wherein visible light produces an image on a photochromic compound.

U.S. Pat. Nos. 6,358,655 and 6,365,312, each to Foucher et al. and incorporated herein by reference in its entirety, describe a marking material for generating images wherein the marking particle includes a photochromic spiropyran material.

Display devices comprised of a liquid crystal composition that is switchable between states, such as black and white, are known and described in, for example, U.S. Pat. No. 6,849,480 to Iftime et al.; U.S. Pat. No. 6,824,708 to Iftime et al.; and U.S. Pat. No. 6,767,240 to Iftime et al., each of which is incorporated herein by reference in its entirety.

It is desirable to provide a reimagable media that is cost-effective and relatively easy to produce.

It is desirable to provide flexible reimagable media that are capable of producing a multi-color display.

The disclosed embodiments are directed to solving one or more of the above-listed problems.

SUMMARY

Before the present methods, systems and materials are described, it is to be understood that the disclosed embodiments are not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "layer" is a reference to one or more layers and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the disclosed embodiments are not entitled to antedate such disclosure by virtue of prior invention.

Polymeric materials may be inexpensively produced as compared to OLED and liquid crystal materials. Polymeric materials may be deposed as films by a variety of techniques, such as spin-coating or doctor blade procedures, under normal conditions. Accordingly, the need for a clean room in developing a reimagable medium may be reduced or eliminated. In addition, the reimagable media described herein does not require electronic drivers for each layer. Instead, only a single electric field generating apparatus, such as a battery connected to two electrodes, may be required. Since only one electric field generating apparatus is required, the additional advantage of reducing cross talk between layers may also occur. For at least these reasons, a reimagable media where one or more of the active layers are made from inexpensive polymeric layers may be significantly less expensive than previous reimagable medias.

In an embodiment, a reimagable medium may include a substrate having a first color, a photochromic layer adjacent to the substrate, a liquid crystal layer that includes a liquid crystal composition and is adjacent to the photochromic layer, and an electric field generating apparatus that is connected across the liquid crystal layer and supplies a voltage across the liquid crystal layer.

In an embodiment, a reimagable medium may include a first photochromic layer, a liquid crystal layer that includes a liquid crystal composition and is adjacent to the first photochromic layer, a second photochromic layer adjacent to the liquid crystal layer, and an electric field generating apparatus that is connected across the liquid crystal layer and supplies a voltage across the liquid crystal layer. In an embodiment, the reimagable medium may further include a substrate having a color. The substrate may be removably attached to the second photochromic layer.

In an embodiment, a method of forming an image on a reimagable medium having a first photochromic layer, a liquid crystal layer, a second photochromic layer and an electric field generating apparatus may include supplying, via the electric field generating apparatus, a first voltage across the liquid crystal layer causing the liquid crystal layer to transfer to a first colored state, and irradiating at least a portion of the first photochromic layer with light having a first wavelength causing the irradiated portion of the first photochromic layer to transfer to a second colored state. In an embodiment, the method may further include irradiating at least a portion of the second photochromic layer with light having a second wavelength causing the irradiated portion of the second photochromic layer to transfer to a third colored state. In an embodiment, the method may further include supplying, via the electric field generating apparatus, a second voltage across the liquid crystal layer causing the liquid crystal layer to transfer to a transparent state. In an embodiment, the method may further include removably attaching a substrate having a color to the second photochromic layer.

BRIEF DESCRIPTION OF THE DRAWINGS

Aspects, features, benefits and advantages of the disclosed embodiments will be apparent with regard to the following description, appended claims and accompanying drawings where:

DETAILED DESCRIPTION

An imaging light may have any suitable predetermined wavelength scope of a single wavelength or a band of wavelengths. In some embodiments, the imaging light may be an ultraviolet light having a single wavelength or a narrow band of wavelengths selected from the ultraviolet light wavelength range of about 200 nm to about 475 nm, particularly a single wavelength at about 365 nm or a wavelength band of about 360 nm to about 370 nm. For each temporary image, the reimagable medium may be exposed to the imaging light for a time period ranging from about 10 milliseconds to about 5 minutes, particularly from about 30 milliseconds to about 1 minute. In some embodiments, the imaging light may have an intensity ranging from about 0.1 mW/cm$^2$ to about 100 mW/cm$^2$, particularly from about 0.5 mW/cm$^2$ to about 10 mW/cm$^2$.

In embodiments, imaging light corresponding to the predetermined image may be generated for example by a computer on a Light Emitting Diode (LED) array screen and the temporary image may be formed on the reimagable medium by placing the medium on the LED screen for a period of time such as the time periods described in the previous paragraph. Suitable UV LED arrays of for example 396 nm are produced by, among others, EXFO (Mississauga, ON, Canada). Another suitable procedure for generating the imaging light corresponding to the predetermined image is the use of UV Raster Output Scanner (ROS).

The color contrast to render the temporary image visible to an observer may be a contrast between for example two, three or more different colors. Even four, five, six or more different colors may be suitable. The term "color" encompasses a number of aspects such as hue, lightness, and saturation where one color can be different from another color if the two colors differ in at least one aspect. For example, two colors having the same hue and saturation but are different in lightness would be considered different colors. Any suitable colors (e.g., red, white, black, gray, yellow and purple) may be used to produce the color contrast as long as the temporary image is visible to the naked eye. In some embodiments, the following exemplary color contrasts may be used: purple temporary image on a white background; yellow temporary image on a white background; dark purple temporary image on a light purple background; and/or light purple temporary image on a dark purple background.

In embodiments, the color contrast may change (e.g., diminish) during the visible time, but the phrase "color contrast" encompasses any degree of color contrast sufficient to render a temporary image discernable to the observer regardless whether the color contrast changes or is constant during the visible time.

Figure 1:
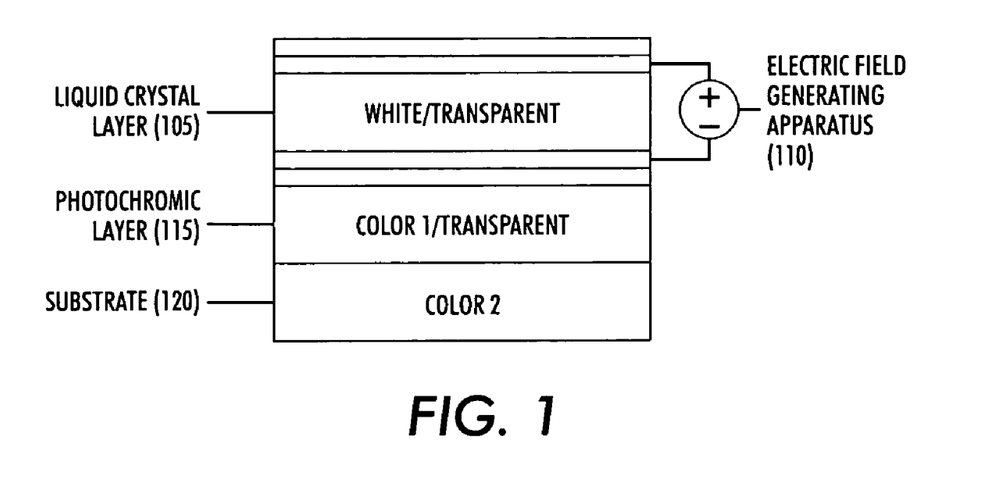
FIG. 1 depicts a schematic representation of a cross section of an exemplary two-layer, reimagable media according to an embodiment.

FIG. 1 depicts a schematic representation of a cross section of an exemplary two-layer reimagable media according to an embodiment. As shown in FIG. 1, the reimagable media 100 may include a liquid crystal cell 105 connected to an electric field generating apparatus 110, a polymeric photochromic layer 115, and a substrate 120. In an embodiment, the top layer of the reimagable media 100 may be a liquid crystal cell 105. The liquid crystal cell 105 may switch between, for example, a white state and a transparent state when an electric field is supplied across the liquid crystal cell 105 by an electric field generating apparatus 110, such as a battery. In an embodiment, the liquid crystal cell 105 may include a domain-controlled liquid crystal as described in U.S. Pat. No. 6,824,708 to Iftime et al. and U.S. Pat. No. 6,767,480 to Iftime et al., which are incorporated herein by reference in their entirety. The liquid crystal composition may include a liquid crystal and a liquid crystal domain stabilizing compound. The liquid crystal composition may switch between a strongly scattering state of a first plurality of smaller liquid crystal domains that strongly scatters a predetermined light and a weakly scattering state of a second plurality of larger liquid crystal domains that weakly scatters the predetermined light. The liquid crystal composition may switch between, for example, a transparent state and a white scattering state. In an embodiment, domain controlled liquid crystals may be used. Specifically, a domain controlled liquid crystals may be a liquid crystal that is bistable, i.e. the domain controlled liquid crystal may maintain a written image after the electric field is removed.

The liquid crystal may be any liquid crystal capable of forming a plurality of liquid crystal domains. In embodiments, the liquid crystal may be for example a chiral nematic (i.e., cholesteric) liquid crystal or a nematic liquid crystal. The liquid crystal may be a single compound or a mixture of two or more different compounds. Many suitable nematic liquid crystals are mixtures of alkyl-biphenylnitrile or alkyl-terphenylnitrile molecules and are commercially available and would be known to those of ordinary skill in the art in view of this disclosure. Exemplary nematic liquid crystals may include, for example, nematic liquid crystal BL mixtures available at EM Industries, Inc., BL001 (E7), BL002 (E8), BL033 (version of BL002) and BL087, and 5CB (commercially available at Sigma-Aldrich).

Cholesteric liquid crystals possessing a positive dielectric anisotropy with a helical pitch chosen to reflect for example in Visible, IR or Near IR regions of the spectrum may be suitable for the purposes of the disclosed embodiments. Cholesteric liquid crystals may be categorized into three types. In a first type, the cholesteric liquid crystal may be a mixture of a cholesteric liquid crystal mixture and a nematic liquid crystal in an amount sufficient to produce desired helical pitch length. Suitable cholesteric liquid crystal mixtures may include, for example, BL mixtures available from EM Industries, Inc. (BL088, BL 90, BL94 and BL108 as a few examples). The helical pitch may be tuned to the desired range by mixing this cholesteric liquid crystal mixture with a nematic liquid crystal described herein.

A second type of cholesteric liquid crystal may be made from a mixture of a nematic liquid crystal and a chiral material in an amount sufficient to generate a desired pitch length. Any chiral material soluble into a nematic liquid crystal may be suitable for the purposes of the disclosed embodiments as long as it is of high enough enantiomeric or diastereoisomeric purity and it has high enough twisting power. High performance chiral materials are commercially available at Merck, for example ZLI4571, ZLI4572 (R1011), S811 and R811.

A third type of cholesteric liquid crystal may be a nematic liquid crystal single compound which is also chiral (hence the name of chiral nematic liquid crystal). Optionally, the chiral nematic liquid crystal single compound may be mixed with a chiral nematic liquid crystal mixture or with a chiral non-liquid crystal material to tune the helical pitch to the desired value.

The liquid crystal domain stabilizing compound may include any compound that: (1) induces (or allows) (along with an applied electric field) the switching between the smaller liquid crystal domains and larger liquid crystal domains; and (2) maintains the liquid crystal domain size after switching when the electric field is zero. In embodiments, the liquid crystal domain stabilizing compound may be an organic dipolar compound.

The chemical structure of the liquid crystal domain stabilizing compound may include an electron donor group and an electron acceptor group connected at the ends of a conjugated path. This may result in the general structure: Donor—Conjugated Path—Acceptor. To ensure miscibility of the dipolar dopant and the liquid crystal, a liquid crystal compatibilizing moiety may be attached to the dipolar dopant molecule. The electron donor may be an atom or a group of atoms that have a negative Hammett parameter. The electron acceptor may be a group of atoms having a positive Hammett parameter.

The donor group may be selected from a group including N, O, S, and P, where the valence of the atom is satisfied by bonding to at least one other moiety to satisfy the valence of the atom; the other moiety or moieties to satisfy the valence of the atom selected as the electron donor moiety may be for instance a hydrogen atom or a short hydrocarbon group, such as a straight alkyl chain having for example 1 to about 3 carbon atoms.

The conjugated bridging moiety may be any suitable group through which electrons can pass from the electron donor moiety (D) to the electron acceptor moiety (A). In embodiments, the conjugated bridging moiety (C) may be a π-electron conjugated bridge that is composed of, for example:

(a) at least one aromatic ring such as one, two or more aromatic rings having for instance from about 6 carbon atoms to about 40 carbon atoms such as —C6H4-, and —C6H4-C6H4-;

(b) at least one aromatic ring such as one, two or more aromatic rings conjugated through one or more ethenyl or ethynyl bonds having for instance from about 8 carbon atoms to about 50 carbon atoms such as —C6H4-CH=CH—C6H4-, and —C6H4-C≡C—C6H4-; and (c) fused aromatic rings having for instance from about 10 to about 50 carbon atoms such as 1,4-C10H6 and 1,5-C10H6.

The electron acceptor moiety (A) may be any suitable atom or group capable of accepting electrons. In embodiments, the electron acceptor moiety (A) may be an electron withdrawing functional moiety which possesses a positive Hammett constant. The electron acceptor moiety may be, for example, one of the following:

(a) an aldehyde (—CO—H);

(b) a ketone (—CO—R) where R may be for example a straight chain alkyl group having for example 1 to about 3 carbon atoms, such as methyl, ethyl, propyl and isopropyl.

(c) an ester (—COOR) where R may be for example a straight chain alkyl group having for example 1 to about 3 carbon atoms, such as methyl, ethyl, propyl and isopropyl.

(d) a carboxylic acid (—COOH);

(e) cyano (CN);

(f) nitro (NO2);

(g) nitroso (N=O);

(h) a sulfur-based group (e.g., —SO2-CH3; and —SO2-CF3);

(i) a fluorine atom; and (k) a boron atom.

The liquid crystal compatibilizing moiety may be connected to the donor group, acceptor group or conjugated path group. The liquid crystal compatibilizing moiety (S) may be any suitable group that increases miscibility of the liquid crystal domain stabilizing compound with the liquid crystal. The liquid crystal compatibilizing moiety (S) may be, for example, one of the following:

(a) a substituted or unsubstituted hydrocarbon having for example 1 to about 30 carbon atoms;

(b) a heterocyclic moiety having for example from 5 to about 15 atoms (referring to number of carbon atoms and heteroatom(s), where the heteroatom can be for instance N, O, S, P, and Se. Exemplary examples include: piperidine, ethyl-piperidine, methylpirrolidine; and (c) a hetero-acyclic moiety having for example from 5 to about 15 atoms (referring to number of carbon atoms and heteroatom(s), where the heteroatom can be for instance N, O, S, P, and Se. Exemplary examples include: glycol and polyglycol ethers, alcohol moieties like for example 2-hydroxy-ethyl, and thiol moieties like for example ethyl-2-methyl-ethyl-thioether.

In embodiments, the liquid crystal compatibilizing moiety (S) may be a hydrocarbon optionally substituted with, for example, a liquid crystal moiety; a heterocyclic moiety optionally substituted with, for example, a liquid crystal moiety; or a hetero-acylic moiety optionally substituted with, for example, a liquid crystal moiety.

The dipolar dopant may be a small molecule or a macromolecule. A macromolecule type of dipolar dopant may require that the precursor monomer have at least one polymerizable group. The polymerizable moieties may be any monomers that can be polymerized to form an oligomer/polymer. Suitable monomers may include those having a double bond (—CH=CH$_2$) or triple bond capable of being polymerized such as acryl or ethenyl.

The second active layer of the reimagable media 100 may be a polymeric photochromic layer 115. The polymeric photochromic layer 115 may be deposed on to the bottom of the liquid crystal layer 105. The polymeric photochromic layer 115 may include a photochromic material, which switches between a colored state (color 1) and a transparent state. In an embodiment, the polymeric photochromic layer 115 may switch to the colored state when illuminated with light within the ultra-violet spectrum. In an embodiment, the wavelength at which the polymeric photochromic layer 115 switches to a colored state may be between about 200 nm and about 475 nm. In an embodiment, the wavelength may be between about 360 nm and about 370 nm. In an embodiment, the wavelength may be about 365 nm. In an embodiment, the wavelength at which the polymeric photochromic layer 115 switches to a transparent state may be within the visible light spectrum. In an embodiment, the polymeric photochromic layer 115 may be deposed on a Mylar™ sheet by a doctor-blade technique from a THF solution of Polymethylmethacrylate/spiropyran.

A substrate 120 may be uniformly colored (color 2) and may be adjacent to the polymeric photochromic layer 115.

The reimagable media 100 of FIG. 1 may display, for example, three colors. The device may display white when the liquid crystal layer 105 is in its white state; color 1 when the liquid crystal layer 105 is in its transparent state and the polymeric photochromic layer 115 is in its colored state; and color 2 when each of the liquid crystal layer 105 and the polymeric photochromic layer 115 are in their transparent states. If the liquid crystal layer 105 is in its white state and the polymeric photochromic layer 115 is in its colored state, the device 100 may display white. Once the color state is defined for each pixel of the reimagable media 100, the pixel may remain stable, and no power may be required to maintain the color state of the pixels.

In an alternate embodiment (not depicted), the locations of the liquid crystal layer 105 and the polymeric photochromic layer 115 of FIG. 1 may be swapped. In such an embodiment, if the liquid crystal layer 105 is in its white state and the polymeric photochromic layer 115 is in its colored state, the reimagable media 100 may display color 1 instead of white. Otherwise, the operation of this embodiment may be similar to the embodiment shown in FIG. 1. Once the color state is defined for each pixel of the reimagable media 100, the pixel may remain stable, and no power may be required to maintain the color state of the pixels.

Figure 2:
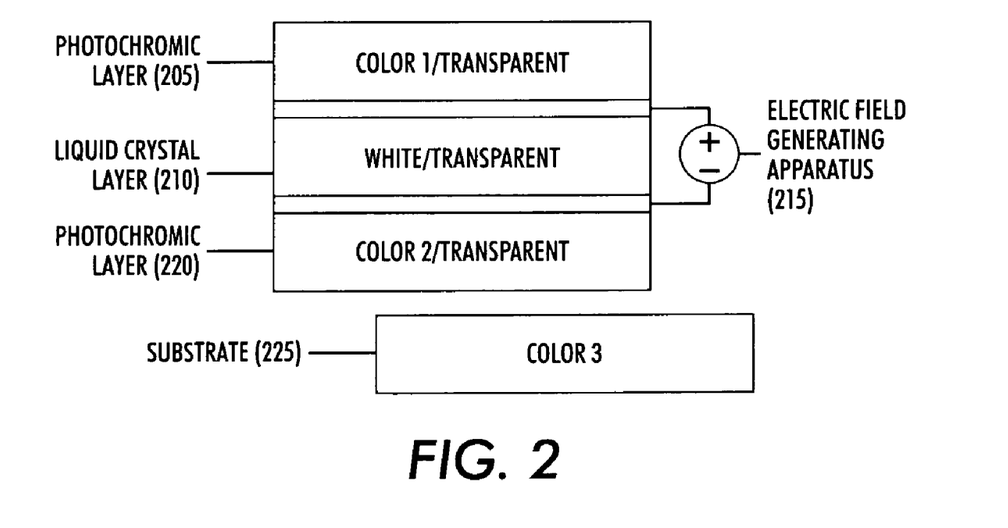
FIG. 2 depicts a schematic representation of a cross section of an exemplary three-layer, reimagable media according to an embodiment.

FIG. 2 depicts a schematic representation of a cross section of an exemplary three-layer reimagable media according to an embodiment. As shown in FIG. 2, the reimagable media 200 may include a first polymeric photochromic layer 205, a liquid crystal cell 210 connected to an electric field generating apparatus 215, a second polymeric photochromic layer 220, and a substrate 225. In an embodiment, the substrate 225 may be removably attached to the second polymeric photochromic layer 220.

In an embodiment, the first layer of the reimagable media 200 may be a first polymeric photochromic layer 205. The first polymeric photochromic layer 205 may be deposed on to the top of the liquid crystal layer 210. The first polymeric photochromic layer 205 may include a photochromic material, which switches between a colored state (color 1) and a transparent state. In an embodiment, the first polymeric photochromic layer 205 may switch to the colored state when illuminated with light within the ultra-violet spectrum. In an embodiment, the wavelength at which the first polymeric photochromic layer 205 switches to a colored state may be between about 200 nm and about 475 nm. In an embodiment, the wavelength may be between about 360 nm and about 370 nm. In an embodiment, the wavelength may be about 365 nm. In an embodiment, the wavelength at which the first polymeric photochromic layer 205 switches to a transparent state may be within the visible light spectrum. In an embodiment, the first polymeric photochromic layer 205 may be deposed on a Mylar™ sheet by a doctor-blade technique from a THF solution of Polymethylmethacrylate/spiropyran.

The second layer of the reimagable media 200 may be a liquid crystal cell 210. The liquid crystal cell 210 may switch between, for example, a white state and a transparent state when an electric field is supplied across the liquid crystal cell 210 by an electric field generating apparatus 215, such as a battery. In an embodiment, the liquid crystal cell 210 may include a domain-controlled liquid crystal, such as the one described above in reference to FIG. 1.

The third layer of the reimagable media 200 may be a second polymeric photochromic layer 220. The second polymeric photochromic layer 220 may be coated on to the bottom of the liquid crystal layer 210. The second polymeric photochromic layer 220 may include a photochromic material, which switches between a colored state (color 2) and a transparent state. In an embodiment, the second polymeric photochromic layer 220 may switch to the colored state when illuminated with light within the ultra-violet spectrum. In an embodiment, the wavelength at which the second polymeric photochromic layer 220 switches to a colored state may be between about 200 nm and about 475 nm. In an embodiment, the wavelength may be between about 360 nm and about 370 nm. In an embodiment, the wavelength may be about 365 nm. In an embodiment, the wavelength at which the second polymeric photochromic layer 220 switches to a transparent state may be within the visible light spectrum. In an embodiment, the second polymeric photochromic layer 220 may be deposed on a Mylar™ sheet by a doctor-blade technique from a THF solution of Polymethylmethacrylate/spiropyran.

Since the first polymeric photochromic layer 205 and the second polymeric photochromic layer 220 are both sensitive to light, cross talking between the layers should be avoided. The placement and features of the liquid crystal layer 210 may assist in avoiding cross talk. In an embodiment, the liquid crystal layer 210 may be driven to its white state prior to writing either the first polymeric photochromic layer 205 or the second polymeric photochromic layer 220. In its white state, the liquid crystal layer 210 may be strongly scattering and may reflect substantially all light. In an embodiment, approximately 99% of light may be reflected. As a result, light does not pass through to the opposing polymeric photochromic layer when a polymeric photochromic layer is being illuminated (written). In this way, both photochromic layers may be independently written with substantially no cross talk by illuminating them from the respective sides of the reimagable media 200.

The reimagable media 200 of FIG. 2 may display, for example, three colors. When looking at the top of the reimagable media 200, it may display white when the liquid crystal layer 210 is in its white state and the first polymeric photochromic layer 205 is in its transparent state; color 1 when the first polymeric photochromic layer 205 is in its colored state; and color 2 when the first polymeric photochromic layer 205 is in its transparent state, the liquid crystal layer 210 is in its transparent state, and the second polymeric photochromic layer 220 is in its colored state. In this arrangement, color 1 may dominate over white and white may dominate over color 2. In other words, if each of the first polymeric photochromic layer 205 and the liquid crystal layer 210 are in their colored states, color 1 may be displayed. When looking at the bottom of the device, the color dominance may be reversed (i.e., color 2 may dominate over white and white may dominate over color 1). Once the color state is defined for each pixel of the reimagable media 200, the pixel may remain stable, and no power may be required to maintain the color state of the pixels.

In an embodiment, the reimagable media 200 may be removably attached to a substrate 225. In an embodiment, the substrate 225 may be uniformly colored to a color 3. When the substrate 225 is attached to the reimagable media 200, the device may display up to four colors. The device may display color 3 when each of the first polymeric photochromic layer 205, the liquid crystal cell 210 and the second polymeric photochromic layer 220 are in their transparent states. Once the color state is defined for each pixel of the reimagable media 200, the pixel may remain stable, and no power may be required to maintain the color state of the pixels.

The photochromic material may exhibit photochromism, which is a reversible transformation of a chemical species induced in one or both directions by absorption of electromagnetic radiation between two forms having different absorption spectra. The first form may be thermodynamically stable, which can be induced by absorption of light to convert to a second form. The back reaction from the second form to the first form may occur, for example, thermally or by absorption of light. Embodiments of the photochromic material may also encompass the reversible transformation of the chemical species among three or more forms if that reversible transformation occurs among more than two forms. The photochromic material may be composed of one, two, three or more different types of photochromic materials, where the term "type" refers to each family of reversibly interconvertible forms, e.g., spiropyran and its isomer merocyanine collectively forming one type (also referred to as one family) of photochromic material. Unless otherwise noted, the term "photochromic material" refers to all molecules of the photochromic material regardless of form. For example, where the photochromic material is of a single type such as spiropyran/merocyanine, at any given moment the molecules of the photochromic material may be entirely spiropyran, entirely merocyanine, or a mixture of spiropyran and merocyanine. In embodiments, for each type of photochromic material, one form is colorless or weakly colored and the other form is differently colored.

When two or more types of photochromic materials are present, each type may be present in an equal or unequal amount by weight ranging for example from about 5% to about 90% based on the weight of all types of the photochromic material.

In some embodiments, the photochromic material may also be thermochromic, i.e., may exhibit thermochromism, which is a thermally induced reversible color change.

Any suitable photochromic material may be used, especially an organic photochromic material. Examples of suitable photochromic materials may include compounds that undergo heterocyclic cleavage, such as spiropyrans and related compounds; compounds that undergo homocyclic cleavage such as hydrazine and aryl disulfide compounds; compounds that undergo cis-trans isomerization such as azo compounds, stilbene compounds and the like; compounds that undergo proton or group transfer phototautomerism such as photochromic quinines; compounds that undergo photochromism via electro transfer such as viologens and the like; and others.

As discussed herein, the photochromic material may exist in a number of forms which are depicted herein by illustrative structural formulas for each type of photochromic material. For the chemical structures identified herein, one form of the photochromic material may be typically colorless or weakly colored (e.g., pale yellow); whereas, the other form typically may have a different color (e.g., red, blue, or purple), which is referred to herein as "differently colored."

Suitable examples of the photochromic material may include spiropyrans compounds and analogue compounds of the general formulas (the closed form may be colorless/weakly colored; the open form may be differently colored):

Closed form (Spiropyran when X = O and Y = CH)   Open form (Merocyanine when X = O and Y = CH)

wherein $R_1$, $R_2$, $R_3$, $R_4$, $R_5$, $R_6$, $R_7$, $R_8$, $R_9$, $R_{10}$, $R_{11}$, $R_{12}$ and $R_{13}$ each, independently of the others may be (but are not limited to) hydrogen; alkyl, including cyclic alkyl groups, such as cyclopropyl, cyclohexyl, and the like, and including unsaturated alkyl groups, such as vinyl ($H_2C$=$CH$—); allyl ($H_2C$=$CH$—$CH_2$—); propynyl ($HC$≡$C$—$CH_2$—); and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 20 carbon atoms and more preferably with from about 1 to about 10 carbon atoms; aryloxy groups, preferably with from about 6 to about 20 carbon atoms and more preferably with from about 6 to about 10 carbon atoms; alkylthio groups, preferably with from about 1 to about 20 carbon atoms and more preferably with from about 1 to about 10 carbon atoms; arylthio groups, preferably with from about 6 to about 20 carbon atoms and more preferably with from about 6 to about 10 carbon atoms; aldehyde groups; ketone groups; ester groups; amide groups; carboxylic acid groups; sulfonic acid groups; and the like. Further, two or more R groups (that is, $R_1$ through $R_{13}$) may be joined together to form a ring.

X may be the oxygen atom (O) or sulfur atom (S). Y may be of the CH group, nitrogen atom (N) or phosphorus atom (P). Compounds with X=O and Y=CH, are known as spiropyrans. In this case, the closed form isomer is known as a spiropyran compound, while the open form isomer is known as a merocyanine compound. Compounds with X=O and Y=N, are known as spirooxazines. Compounds with X=S and Y=CH are known as spirothiopyrans.

Examples of spiropyrans may include spiro[2H-1-benzopyran-2,2'-indolines], including those of the general formula I, wherein substituents can be present on one or more of the 1', 3', 4', 5', 6', 7', 3, 4, 5, 6, 7, and 8 positions; spiroindolinonaphthopyrans, including those of the general formula II, wherein substituents can be present on one or more of the 1, 3, 4, 5, 6, 7, 1', 2', 5', 6', 7', 8', 9' or 10' positions; and aza-spiroindolinopyrans, including those of the general formula III, wherein substituents can be present on one or more of the 3, 4, 5, 6, 7, 3', 4', 5', 6', 7', 8', and 9' positions.

I

II

III

Examples of spirooxazines may include spiro[indoline-2,3'-[3H]-naphtho[2,1-b]-1,4-oxazines], including those of the general formula IV, wherein substituents can be present on one or more of the 1, 3, 4, 5, 6, 7, 1', 2', 5', 6', 7', 8', 9', or 10' positions; spiro[1,4-benzoxazine-2,2'-indolines], including those of the general formula V, wherein substituents can be present on one or more of the 3, 5, 6, 7, 8, 1', 4', 5', 6', and 7' positions, and the like.

Examples of spirothiopyrans may include spiro[2H-1-benzothiopyran-2,2'-indolines], including those of the general formula VI, wherein substituents can be present on one or more of the 1', 3', 4', 5', 6', 7', 3, 4, 5, 6, 7, and 8 positions, and the like.

IV

V

VI

In all of the above examples of spiropyrans, spirooxazines and spirothiopyrans, examples of substituents are the same as described for $R_1$, $R_2$, $R_3$, $R_4$, $R_5$, $R_6$, $R_7$, $R_8$, $R_9$, $R_{10}$, $R_{11}$, $R_{12}$ and $R_{13}$.

Electron donor substituents like for example amino, alkoxy or groups and electron donor substituents like for example nitro or cyano, spiropyran, spirooxazine, and spirothiopyran, may be adjusted to affect the color of the open form of the photochromic material, as well as the absorption spectrum of the closed form. Substituents on the central moiety of the spiropyrans, spirooxazines, and spirothiopyrans or on alkyl or aryl groups attached thereto also may affect the color of the open form of the photochromic material, although to a lesser degree than substituents on the left ring. Further, substituents may be tuned as to affect the solubility of the compound in various liquids and resins. Substituents with long chain hydrocarbons, such as those with 16 or 18 carbon atoms, may increase solubility in hydrocarbons. Sulfonate and carboxylate groups, for example, may enhance water solubility.

Specific examples of spiropyrans, spirooxazines, and spirothiopyrans include 1',3'-dihydro-1',3',3'-trimethyl-6-nitrospiro-[2H-1-benzopyran-2,2'-(2H)-indole]; 1',3'-dihydro-1',3',3'-trimethyl-5'-nitrospiro-[2H-1-benzopyran-2,2'-(2H)-indole], 1',3'-dihydro-1',3',3'-trimethyl-6-cyano-spiro-[2H-1-benzopyran-2,2'-(2H)-indole], 1',3'-dihydro-1',3',3'-trimethyl-8-nitrospiro-[2H-1-benzopyran-2,2'-(2H)-indole], 1',3'-dihydro-1',3',3'-trimethyl-6-nitro, 8-methoxy-spiro-[2H-1-benzopyran-2,2'-(2H)-indole], 1',3'-dihydro-1'-decyl-,3',3'-dimethyl-6-nitrospiro-[2H-1-benzopyran-2,2'-(2H)-indole], 1,3-dihydro-1,3,3-trimethylspiro[2H-indole-2,3'-3H]naphth[2,1-b]-[1,4]oxazine], 1,3-dihydro-1,3,3-trimethyl-5-nitrospiro[2H-indole-2,3'-[3H]naphth[2,1-b]-[1,4]oxazine], 1,3-dihydro-1,3,3-trimethyl-5,6'-dinitro-spiro[2H-indole-2,3'-3H]naphth[2,1-b]-[1,4]oxazine], 1,3-dihydro-1,3,3-trimethyl-5-methoxy, 5'-methoxy-spiro[2H-indole-2,3'-[3H]naphth[2,1-b]-[1,4]oxazine], 1,3-dihydro-1-ethyl-3,3-dimethyl-5'-nitrospiro[2H-indole-2,3'-[3H]naphth[2,1-b]-[1,4]oxazine], 1,3',3'-trimethylspiro[2H-1-benzothiopyran-2,2'-indoline].

A representative methodology for synthesis of spiropyrans is by condensation of a readily available Fisher's base with salicylaldehyde derivatives. Extensive coverage of synthetic procedures and references are described in J. C. Crano and R. J. Guglielmetti, Organic Photochromic and Thermochromic Compounds, Vol. 1, Main Photochromic Families (Topics in Applied Chemistry), Plenum Press, New York (1999), the disclosure of which is incorporated herein by reference in its entirety.

Another class of suitable photochromic materials are stilbenes of general formulas (the Cis form may be colorless/weakly colored; the Trans form may be differently colored):

Trans          Cis wherein one, two, three or more substituents may be optionally present at the 2, 3, 4, 5, 6, 2', 3', 4', 5', and 6' positions. Examples of suitable substituents may include (but are not limited to) alkyl, including cyclic alkyl groups, such as cyclopropyl, cyclohexyl, and the like, and including unsaturated alkyl groups, such as vinyl ($H_2C=CH$), allyl ($H_2C=CH-CH_2-$), propynyl ($HC\equiv C-CH_2-$), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups; preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring.

Specific examples of stilbenes include stilbene (no substituents), 3-methylstilbene, 4-methoxystilbene, 3-methoxystilbene, 4-aminostilbene, 4-fluorostilbene, 3-fluorostilbene, 4-chlorostilbene, 3-chlorostilbene, 4-bromostilbene, 3-bromostilbene, 3-iodostilbene, 4-cyanostilbene, 3-cyanostilbene, 4-acetylstilbene, 4-benzoylstilbene, 4-phenacylstilbene, 4-nitrostilbene, 3-nitrostilbene, 3-nitro-3'-methoxystilbene, 3-nitro-4-dimethylaminostilbene, 4,4'-dinitrostilbene, 4-nitro-4'-methoxystilbene, 4-nitro-3'-methoxystilbene, 4-nitro-4'-aminostilbene, 4-nitro-4'-dimethylaminostilbene, α-methylstilbene, α,α'-dimethylstilbene, α,α'-difluorostilbene, α,α'-dichlorostilbene, 2,4,6-trimethylstilbene, 2,2',4,4',6,6'-hexamethylstilbene, and the like. Stilbene compounds are well known and may be prepared as described in, for example, G. S. Hammond et al., J. Amer. Chem. Soc., vol. 86, p. 3197 (1964), W. G. Herkstroeter et al., J. Amer. Chem. Soc., vol. 88, p. 4769 (1966), D. L. Beveridge et al., J. Amer. Chem. Soc., vol. 87, p. 5340 (1965), D. Gegiou et al., J. Amer. Chem. Soc., vol. 90, p. 3907 (1968), D. Schulte-Frohlinde et al., J. Phys. Chem., vol. 66, p. 2486 (1962), S. Malkin et al., J. Phys. Chem., vol. 68, p. 1153 (1964), S. Malkin et al., J. Phys. Chem., vol. 66, p. 2482 (1964), H. Stegemeyer, J. Phys. Chem., vol. 66, p. 2555 (1962), H. Gusten et al., Tetrahedron Lett., vol. 1968, p. 3097 (1968), D. Gegiou et al., J. Amer. Chem. Soc., vol. 90, p. 12 (1968), K. Kruger et al., J. Phys. Chem., vol. 66, p. 293 (1969), and D. Schulte-Frohlinde, Ann., vol. 612, p. 138 (1958), the disclosures of each of which are incorporated herein by reference in its entirety.

Aromatic azo compounds which exhibit photochromism are of the general formulas (the Cis form may be colorless/weakly colored; the Trans form may be differently colored):

Trans          Cis wherein Ar₁ and Ar₂ are each, independently of the other, selected from the group consisting of aromatic groups. The aromatic groups may be substituted, with examples of substituents including (but not limited to) alkyl, including cyclic alkyl groups, such as cyclopropyl, cyclohexyl, and the like, and including unsaturated alkyl groups, such as vinyl (H₂C═CH—), allyl (H₂C═CH—CH₂—), propynyl (HC≡C—CH₂—), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Alkyl, aryl, and arylalkyl substituents may also be further substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring.

Examples of photochromic azo compounds include azobenzene, 2-methoxyazobenzene, 2-hydroxyazobenzene, 3-methylazobenzene, 3-nitroazobenzene, 3-methoxyazobenzene, 3-hydroxyazobenzene, 4-iodoazobenzene, 4-methylazobenzene, 4-carbomethoxyazobenzene, 4-acetylazobenzene, 4-carboxyazobenzene, 4-cyanoazobenzene, 4-ethoxyazobenzene, 4-methoxyazobenzene, 4-nitroazobenzene, 4-acetamidoazobenzene, 4-dimethylaminoazobenzene, 4-aminoazobenzene, 4-trimethylammonium azobenzene, 4-dimethylamino-4'-phenylazobenzene, 4-dimethylamino-4'-hydroxyazobenzene, 4,4'-bis-(dimethylamino)azobenzene, 4-dimethylamino-4'-p-aminophenylazobenzene, 4- dimethylamino-4'-p-acetamidophenylazobenzene, 4-dimethylamino-4'-p-aminobenzylazobenzene, 4-dimethylamino-4'-mercuric acetate azobenzene, 4-hydroxyazobenzene, 2-methyl-4-hydroxyazobenzene, 4-hydroxy-4'-methylazobenzene, 2,6-dimethyl-4-hydroxyazobenzene, 2,2'-4',6,6'-pentamethyl-4-hydroxyazobenzene, 2,6-dimethyl-2',4',6'-trichloro-4-hydroxyazobenzene, 4-hydroxy-4'-chloroazobenzene, 2,2',4',6'-tetrachloro-4-hydroxyazobenzene, 3-sulfonate-4-hydroxyazobenzene, 2,2'-dimethoxyazobenzene, 3,3'-dinitroazobenzene, 3,3'-dimethylazobenzene, 4,4'-dimethylazobenzene, 4,4'-dimethoxyazobenzene.

Polymeric azo materials are also suitable as the photochromic material. Aromatic azo compounds are well known and may be prepared as described in, for example, A. Natansohn et al., Macromolecules, vol. 25, p. 2268 (1992); G. Zimmerman et al., J. Amer. Chem. Soc., vol. 80, p. 3528 (1958); W. R. Brode, in The Roger Adams Symposium, p. 8, Wiley (New York 1955); D. Gegiou et al., J. Amer. Chem. Soc., vol. 90, p. 3907 (1968); S. Malkin et al., J. Phys. Chem., vol. 66, p. 2482 (1962); D. Schulte-Frohlinde, Ann., vol. 612, p. 138 (1958); E. I. Stearns, J. Opt. Soc. Amer., vol. 32, p. 382 (1942); W. R. Brode et al., J. Amer. Chem. Soc., vol. 74, p. 4641 (1952); W. R. Brode et al., J. Amer. Chem. Soc., vol. 75, p. 1856 (1953); E. Fischer et al., J. Chem. Phys., vol. 27, p. 328 (1957); G. Wettermark et al., J. Amer. Chem. Soc., vol. 87, p. 476 (1965); G. Gabor et al., J. Phys. Chem., vol. 72, p. 3266 (1968); M. N. Inscoe et al., J. Amer. Chem. Soc., vol. 81, p. 5634 (1959); E. Fischer et al., J. Chem. Soc., vol. 1959, p. 3159 (1959); G. Gabor et al., J. Phys. Chem., vol. 66, p. 2478 (1962); G. Gabor et al., Israel J. Chem., vol. 5, p. 193 (1967); D. Bullock et al., J. Chem. Soc., vol. 1965, p. 5316 (1965); R. Lovrien et al., J. Amer. Chem. Soc., vol. 86, p. 2315 (1964); J. H. Collins et al., J. Amer. Chem. Soc., vol. 84, p. 4708 (1962), each of which is incorporated herein by reference in its entirety.

Also suitable as the photochromic material are benzo and naphthopyrans (Chromenes) of general formulas (the closed form may be colorless/weakly colored; the open form may be differently colored):

wherein one, two, three or more substituents may be optionally present at the 1, 2, 3 and 4 positions, wherein the substituents and R₁ and R₂ are each, independently of the other, selected from the group consisting of aromatic groups. The aromatic groups may be substituted, with examples of substituents including (but not limited to) alkyl, including cyclic alkyl groups, such as cyclopropyl, cyclohexyl, and the like, and including unsaturated alkyl groups, such as vinyl (H₂C═CH—), allyl (H₂C═CH—CH₂—), propynyl (HC≡C—CH₂—), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Alkyl, aryl, and arylalkyl substituents may also be further substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring.

Specific examples of chromenes include 3,3-diphenyl-3H-naphtho[2,1-b]pyran; 2-methyl-7,7-diphenyl-7H-pyrano-[2,3-g]-benzothyazole; 2,2'-spiroadamantylidene-2H-naphtho-[1,2-b]pyran.

Synthesis of chromenes is described in detail for example in the following references: P. Bamfield, Chromic Phenomena, Technological applications of color chemistry, RSC, Cambridge, 2001 and J. C. Crano and R. J. Guglielmetti, Organic Photochromic and Thermochromic Compounds, Vol. 1, Main Photochromic Families (Topics in Applied Chemistry), Plenum Press, New York, 1999, each of which is incorporated herein by reference in its entirety.

Bisimidazoles of the following general formulas are also suitable as the photochromic material (the form on the left may be colorless/weakly colored; the form on the right may be differently colored):

wherein one, two, three or more substituents may be optionally present at the 2, 4, 5, 2', 4', and 5' positions. Examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring.

Specific examples of photochromic bisimidazoles include 2,2',4,4',5,5'-hexaphenyl bisimidazole, 2,2',4,4',5,5'-hexa-p-tolyl bisimidazole, 2, 2',4,4',5,5'-hexa-p-chlorophenyl bisimidazole, 2,2'-di-p-chlorophenyl-4,4',5,5'-tetraphenyl bisimidazole, 2,2'-di-p-anisyl-4,4',5,5'-tetraphenyl bisimidazole, and the like. Bisimidazole compounds are known, and may be prepared as described in, for example, Y. Sakaino, J. Chem. Soc., Perkin Trans I, p. 1063 (1983), T. Hayashi et al., Bull. Chem. Soc. Japan, vol. 33, p. 565 (1960), T. Hayashi et al., J. Chem. Phys., vol. 32, p. 1568 (1960), T. Hayashi et al., Bull. Chem. Soc. Japan, vol. 38, p. 2202 (1965), and D. M. White et al., J. Org. Chem., vol. 29, p. 1926 (1964), each of which is incorporated herein by reference in its entirety.

Spirodihydroindolizines and related systems (tetrahydro- and hexahydroindolizine are also suitable photochromic materials). The general formulas of spirodihydroindolizines are shown below (the closed form may be colorless/weakly colored; the open form may be differently colored):

Closed form      Open form wherein one, two, three or more substituents may be optionally present at the 4, 5, 6, 7, 8, 9, 10, 11, 12 and 13 positions. Examples of substituents include (but are not limited to) alkyl, including cyclic alkyl groups, such as cyclopropyl, cyclohexyl, and the like, and including unsaturated alkyl groups, such as vinyl (H₂C═CH—), allyl (H₂C═CH—CH₂—), propynyl (HC≡C—CH₂—), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring.

Specific examples of photochromic spirodihydroindolizines include for example 4,5-dicarbomethoxy-3H-pyrazole-(3-spiro-9)-fluorene; 1'H-2',3'-6 tricarbomethoxy-spiro(fluorine-9-1'-pyrrolo[1,2-b]-pyridazine]; 1'H-2',3'-dicyano-7-methoxy-carbonyl-spiro[fluorine-9,1'-pyrrolo-[1,2-b] pyridine.

Spirodihydroindolizines synthesis is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, which is incorporated herein by reference in its entirety.

Photochromic quinones of formulas (the form on the left may be colorless/weakly colored; the form on the right may be colored):

wherein one, two, three or more substituents may be optionally present at the 2, 4, 5, 6 and 7 positions. Examples of substituents and the R moiety include (but are not limited to) alkyl, including cyclic alkyl groups, such as cyclopropyl, cyclohexyl, and the like, and including unsaturated alkyl groups, such as vinyl (H₂C═CH), allyl (H₂C═CH—CH₂—), propynyl (HC≡C—CH₂—), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring. In embodiments, the R moiety is hydrogen.

Specific examples of photochromic quinone include for example 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene.

Photochromic quinones synthesis is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, which is incorporated herein by reference in its entirety.

Perimidinespirocyclohexadienones of the following formulas are suitable as the photochromic material (the form on the left may be colorless/weakly colored; the form on the right may be differently colored):

wherein one, two, three or more substituents may be optionally present at the 1, 2, 4, 5, 6, 7 and 8 positions. Examples of substituents and the R moiety include (but are not limited to) alkyl, including cyclic alkyl groups, such as cyclopropyl, cyclohexyl, and the like, and including unsaturated alkyl groups, such as vinyl ($H_2C=CH$), allyl ($H_2C=CH—CH_2—$), propynyl ($HC≡C—CH_2—$), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring. In embodiments, the R moiety is hydrogen.

Specific examples of photochromic perimidinespirocyclohexadienones include for example 2,3-dihydro-2-spiro-4'-(2',6'-di-tert-butylcyclohexadien-2',5'-one)-perimidine; 1-methyl-2,3-dihydro-2-spiro-4'-(2',6'-di-tert-butylcyclohexadien-2',5'-one)-perimidine; 2,3-dihydro-2-spiro-4'-[(4H)-2'-tert-butylnaphthalen-1'-one]perimidine; 5,7,9-trimethyl-2,3-dihydro-2-spiro-4'-(2',6'-di-tert-butylcyclohexadien-2',5'-one)-pyrido-[4,3,2,d,e]quinazoline.

Photochromic perimidinespirocyclohexadienones synthesis is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, which is incorporated herein by reference in its entirety.

Photochromic viologens of the following formulas (the form on the left may be colorless/weakly colored; the form on the right may be differently colored):

wherein one, two, three or more substituents may be optionally present at the 1, 2, 3, 4, 5, 6, 7 and 8 positions. Examples of substituents and R moiety include (but are not limited to) alkyl, including cyclic alkyl groups, such as cyclopropyl, cyclohexyl, and the like, and including unsaturated alkyl groups, such as vinyl (H₂C=CH—), allyl (H₂C=CH—CH₂—), propynyl (HC≡C—CH₂—), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring. In embodiments, the R moiety is hydrogen.

The X moiety may be any anion that acts as a counterion and is needed to compensate the positive charge of the bipyridinium cation. The X moiety may be for example a halogen anion like fluoride, chloride, bromide and iodide ions, tosylate, triflate and other anions.

Specific examples of photochromic viologens include for example N,N'-dimethyl-4,4'-bipyridinium dichloride; N,N'-diethyl-4,4'-bipyridinium dibromide; N-phenyl, N'-methyl-4,4,-bipyridinium dichloride and the like.

Synthesis of photochromic viologens is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, which is incorporated herein by reference in its entirety.

Fulgides and fulgimides of the following formulas are suitable as the photochromic material (the open form may be colorless/weakly colored; the closed form may be differently colored):

Open form    X = O (fulgides)    Closed form
             X = NR (fulgimides)

wherein one, two, three or more substituents may be optionally present at the 1, 2, 4, 5 and 6 positions. Examples of substituents and the R moiety include (but are not limited to) alkyl, including cyclic alkyl groups, such as cyclopropyl, cyclohexyl, and the like, and including unsaturated alkyl groups, such as vinyl (H₂C=CH—), allyl (H₂C=CH—CH₂—), propynyl (HC≡C—CH₂—), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring. In embodiments, the R moiety is hydrogen.

Specific examples of fulgides include 1-(p-methoxyphenyl)-ethylidene(isopropylidene)succinic anhydride; 2-[1-(2,5-dimethyl-3-furyl)-2-methylpropylidene]-3-isopropylidene succinic anhydride; (1,2-dimethyl-4-isopropyl-5-phenyl)-3-pyrryl ethylidene(isopropylidene)succinic anhydride.

Synthesis of photochromic fulgides is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, which is incorporated herein by reference in its entirety.

Diarylethenes and related compounds of the following formulas are suitable as the photochromic material (the open form may be colorless/weakly colored; the closed form may be differently colored):

Open form                Closed form wherein one, two, three or more substituents may be optionally present at the 1, 2, 3, 4, 1', 2', 3' and 4' positions. Examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and aryla-lkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring.

Specific examples of diarylethylenes include 1,2-bis-(2,4-dimethylthiophen-3-yl)perfluorocyclopentene; 1,2-bis-(3,5-dimethylthiophen-3-yl)perfluorocyclopentene; 1,2-bis-(2,4-diphenyllthiophen-3-yl)perfluorocyclopentene.

Synthesis of photochromic diarylethenes is known and is described for example in J. C. Crano and R. J. Guglielmetti, Organic Photochromic and Thermochromic Compounds, Vol. 1, Main Photochromic Families (Topics in Applied Chemistry), Plenum Press, New York, 1999, which is incorporated herein by reference in its entirety.

Triarylmethanes of the following formulas are suitable as the photochromic material (the form on the left may be colorless/weakly colored; the form on the right may be differently colored):

wherein one, two, three or more substituents may be optionally present at the 1, 2, 3, 4, 5, 6, 7, 1', 2', 3, 4', 5' and 6' positions. Examples of substituents and the R moiety include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring. In embodiments, the R moiety is hydrogen.

Specific examples of triarylmethanes include compounds X, XI and XII.

X

XI

XII

Synthesis of triarylmethanes is described for example in H. Taro, M. Kodo, Bull. Chem. Soc. Jpn., 38(12) p. 2202 (1965), which is incorporated herein by reference in its entirety.

Anils and related compounds of the following formulas are suitable as the photochromic material (the form on the left may be colorless/weakly colored; the form on the right may be differently colored):

wherein one, two, three or more substituents may be optionally present at the 1, 2, 3, 4, 5, 6, 7, 8 and 9. Examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from about 1 to about 50 carbon atoms and more preferably with from about 1 to about 30 carbon atoms; aryl, preferably with from about 6 to about 30 carbon atoms and more preferably with from about 6 to about 20 carbon atoms; arylalkyl, preferably with from about 7 to about 50 carbon atoms and more preferably with from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 50 carbon atoms and more preferably with from about 1 to about 30 carbon atoms; aryloxy groups, preferably with from about 6 to about 30 carbon atoms and more preferably with from about 6 to about 20 carbon atoms; alkylthio groups, preferably with from about 1 to about 50 carbon atoms and more preferably with from about 1 to about 30 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. The alkyl, aryl, and arylalkyl groups may also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, preferably with from about 1 to about 30 carbon atoms and more preferably with from about 1 to about 20 carbon atoms; aryloxy groups, preferably with from about 6 to about 30 carbon atoms and more preferably with from about 6 to about 20 carbon atoms; alkylthio groups, preferably with from about 1 to about 30 carbon atoms and more preferably with from about 1 to about 20 carbon atoms; arylthio groups, preferably with from about 6 to about 30 carbon atoms and more preferably with from about 6 to about 20 carbon atoms; aldehyde groups; ketone groups; ester groups; amide groups; carboxylic acid groups; sulfonic acid groups; and the like. Further, two or more substituents may be joined together to form a ring.

Specific examples of anils and related compounds include molecules XIII, XIV, XV and the like.

Photochromic anils are known and their synthesis has been described for example in K. Kownacki, L. Kaczmarek, A. Grabowska, Chem. Phys. Lett., 210, p. 373 (1993); M. S. M. Rawat, S. Mal, G. Pant, Current Science, 58, p.796 (1989); P. F. Barbara, P. M., Rentzepis, L. E. Brus, J. Am. Chem. Soc., 102, p. 2786 (1980), each of which is incorporated herein by reference in its entirety.

A binder may optionally be present. The role of the binder may be that of a suspending medium to hold the photochromic material as a film or layer on the substrate of interest. The desired properties of the binder are any or all of the following: mechanical flexibility, robustness, and optical clarity. In some embodiments, the binder may not be highly crystalline or light scattering so that the imaging light may image the photochromic material, and the temporary images are of sufficient contrast. Moreover, in embodiments, the binder may be a solid, nonvolatile material that will not be removed from the substrate.

Any suitable binder may be used such as a polymer material. Examples of polymer materials that may be used as binders include: polycarbonates, polystyrenes, polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins and the like. Copolymer materials such as polystyrene-acrylonitrile, polyethylene-acrylate, vinylidenechloride-vinylchloride, vinylacetate-vinylidene chloride, styrene-alkyd resins are also examples of suitable binder materials. The copolymers may be block, random, or alternating copolymers.

Examples of polycarbonates as the binder include: poly (bisphenol-A-carbonate) and polyethercarbonates obtained from the condensation of N,N'-diphenyl-N,N'-bis(3-hydroxy phenyl)-[1,1'-biphenyl]-4,4'-diamine and diethylene glycol bischloroformate.

Examples of polystyrenes as the binder include: polystyrene, poly (bromostyrene), poly (chlorostyrene), poly (methoxystyrene), poly (methylstyrene).

Examples of polyolefins as the binder include: polychloroprene, polyethylene, poly(ethylene oxide), polypropylene, polybutadiene, polyisobutylene, polyisoprene, and copolymers of ethylene, including poly(ethylene/acrylic acid), poly (ethylene/ethyl acrylate), poly(ethylene/methacrylic acid), poly(ethylene/propylene), poly(ethylene/vinyl acetate), poly (ethylene/vinyl alcohol), poly(ethylene/maleic anhydride).

Examples of polyacrylates as the binder include: poly(methyl methyacrylate), poly(cyclohexyl methacrylate), poly(n-butyl methacrylate), poly(sec-butyl methacrylate), poly(isobutyl methacrylate), poly(tert-butyl methyacrylate), poly(n-hexyl methacrylate), poly(n-decyl methacrylate), poly(lauryl methacrylate), poly(hexadecyl methacrylate), poly(isobornyl methacrylate), poly(isopropyl methacrylate), poly(isodecyl methacrylate), poly(isooctyl methacrylate), poly(noeopentyl methacrylate), poly(octadecylmethacrylate), poly(octyl methacrylate), poly(n-propyl methacrylate), poly(phenyl methacrylate), poly(n-tridecyl methacrylate), as well as the corresponding acrylate polymers. Other examples include: poly(acrylamide), poly(acrylic acid), poly(acrylonitrile), poly(benzylacrylate), poly(benzylmethacrylate), poly(2-ethylhexyl acrylate), poly(triethylene glycol dimethacrylate). Commercial examples of these materials include acrylic and methacrylic ester polymers such as ACRYLOID™ A10 and ACRYLOID™ B72, polymerized ester derivatives of acrylic and alpha-acrylic acids both supplied by the Rohm and Haas Company, and LUCITE™ 44, LUCITE™ 45 and LUCITE™ 46 polymerized butyl methacrylates supplied by the duPont Company.

Examples of polyvinyl derivatives as the binder include: poly(vinyl alcohol), poly(vinyl acetate), poly(vinyl chloride), poly(vinyl butyral), poly(vinyl fluoride), poly(vinyl pyridine), poly(vinyl pyrrolidone), poly(vinyl stearate). Commercially available polyvinyl derivatives include chlorinated rubber such as PARLON™ supplied by the Hercules Powder Company; copolymers of polyvinyl chloride and polyvinyl acetate such as Vinylite VYHH and VMCH manufactured by the Bakelite Corporation; alkyd resins such as GLYPTAL™ 2469 manufactured by the General Electric Co.

Examples of cellulose derivatives as the binder include: cellulose, cellulose acetate, cellulose acetate butyrate, cellulose propionate, cellulose triacetate, ethyl cellulose, hydroxypropyl cellulose, and methylcellulose.

Examples of polyurethanes as the binder include aliphatic and aromatic polyurethanes like NEOREZ™ 966, NEOREZ™ R-9320 and the like, manufactured by NeoResins Inc., copolymers of polyurethanes with polyethers and polycarbonates like THECOTHANE®, CARBOTHANE®, TECHOPHYLIC® manufactured by Thermadics in Wilmington, Mass. (USA), BAYDUR® and BAYFIT®, BAYFLEX® and BAYTEC® polyurethane polymers manufactured by Bayer.

Examples of polyamides as the binder include: Nylon 6, Nylon 66, TACTEL™ which is a registered mark of duPont, modified polyamides like ARLEN™ from Mitsui Chemicals and TORLON®.

Examples of polyesters as the binder include: poly(ethylene terepthalate), poly(ethylene napthalate) and the like.

Examples of silicone resins as the binder include: polydimethylsiloxane, DC-801, DC804, and DC-996, all manufactured by the Dow Coming Corp. and SR-82, manufactured by GE Silicones. Other examples of silicone resins include copolymers such as silicone polycarbonates, that may be cast into films from solutions in methylene chloride. Such copolymers are disclosed in U.S. Pat. No. 3,994,988 to Laurin. Other examples of silicone resins include siloxane modified acrylate and methacrylate copolymers described in U.S. Pat. No. 3,878,263 to Martin and U.S. Pat. No. 3,663,650 to Juliano. Methacryl silanes include COATOSIL® 1757 silane, SILQUEST®A-174NT, SILQUEST®A-178, and SILQUEST®Y-9936, and vinyl silane materials include COATOSILS 1706, SILQUEST® A-171, and SILQUEST®A-151, all manufactured by GE-Silicones. Also, solvent-based silicone coatings include UVHC3000, UVHC8558, and UVHC8559, also manufactured by GE-Silicones. Aminofunctional silicones may be combined with other polymers to create polyurethanes and polyimides. Examples of aminofunctional silicones include DMS-A11, DMS-A12, DMS-A15, DMS-A21, and DMS-A32, manufactured by Gelest Inc. Silicone films may also be prepared via RTV addition cure of vinyl terminated polydimethylsiloxanes, as described by Gelect Inc. The following formulation may be used:

| | |
|---|---|
| DMS-V31 | 1000 cSt vinyl terminated polydimethylsiloxane - 100 parts; |
| SIS6962.0 | hexamethyldisilazane treated silica - 50 parts; |
| MHS-301 | methylhydrosiloxane-dimethylsiloxane copolymer - 3 to 4 parts; and |
| SIP6830.0 | platinum complex solution - 150 to 200 ppm. |

Another example of silicone-based coating binders is a cured elastomer derived from the SYLGARD® line of silicone materials. Examples of such materials include SYLGARD® 182 SYLGARD® 184 and SYLGARD® 186, available from Dow Corning.

Examples of epoxy resins as the binder include: cycloaliphatic epoxy resins and modified epoxy resins like for example Uvacure 1500 series manufactured by Radcure Inc.; bisphenol-A based epoxy resins like for example D.E.R. 661, D.E.R. 671 and D.E.R. 692H all available at Dow Corning Company. Other examples include aromatic epoxy acrylates like LAROMER™ EA81, LAROMER™ LR 8713 and LAROMER™ LR9019, modified aromatic epoxy acrylate like LAROMER™ LR 9023, all commercially available at BASF.

The binder may be composed of one, two, three or more different binders. When two or more different binders are present, each binder may be present in an equal or unequal amount by weight ranging for example from about 5% to 90%, particularly from about 30% to about 50%, based on the weight of all binders.

A light absorbing material is optionally present and may be composed of one, two or more light absorbing materials. To explain the purpose of the light absorbing material, one first considers that the photochromic material is capable of reversibly converting among a number of different forms, wherein one form has an absorption spectrum that overlaps with the predetermined wavelength scope. The light absorbing material exhibits a light absorption band with an absorption peak, wherein the light absorption band overlaps with the absorption spectrum of the one form of the photochromic material. The phrase "absorption spectrum" refers to light absorption at a range of wavelengths where the light absorption is greater than a minimal amount. Within the absorption spectrum, there is at least one "light absorption band." The phrase "light absorption band" refers to a range of wavelengths where the absorption is at a relatively high level, typically including an absorption peak where the absorption is at the maximum amount for that "light absorption band." The light absorbing material may be selected based on its absorption spectrum compared with the absorption spectrum of the one form of the photochromic material. The one form of the photochromic material that is compared with the optional light absorbing material may be any form of the photochromic material based on for example color or thermodynamic stability. In embodiments, the absorption spectrum of the light absorbing material is compared to the absorption spectrum of the more thermodynamically stable form of the photochromic material where for the exemplary reversibly interconvertible forms of spiropyran and merocyanine, spiropyran is considered the more thermodynamically stable form. The phrase "thermodynamically stable form" refers to the compound which is more stable in the absence of external stimuli. For example, a mixture of spiropyran and its corresponding merocyanine of any ratio between the two forms will evolve to 100% spiropyran if given enough time and the mixture is not exposed to stimuli like light. Spiropyran (closed form) is the more thermodynamically stable form.

EXAMPLE

Bi-layer Electronic Paper Device

Figure 3:
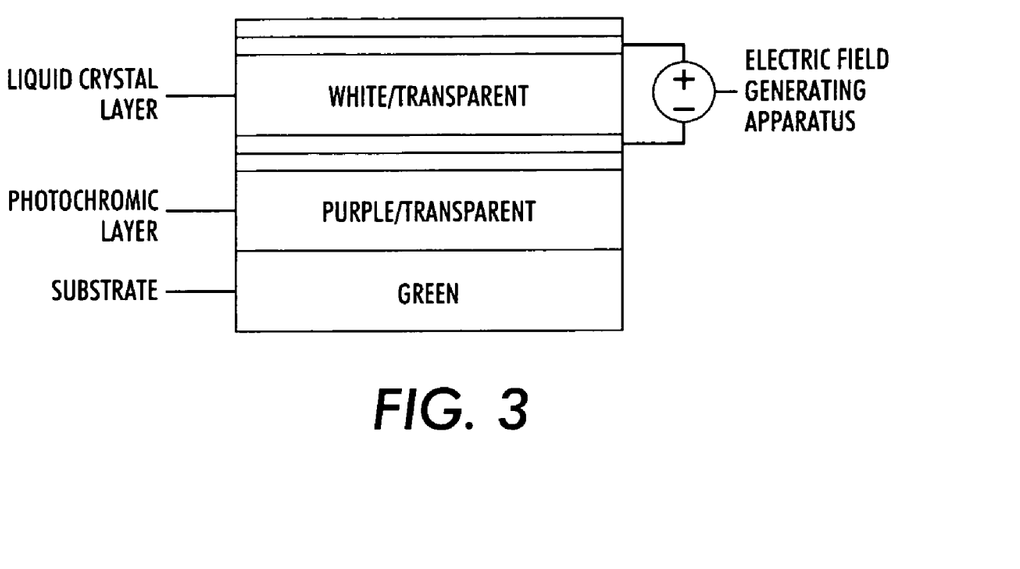
FIG. 3 depicts a schematic representation of a cross section of an exemplary two-layer, reimagable media according to an embodiment.

A bi-layer display including a first layer of a domain controlled liquid crystal material capable of switching between white and transparent states, a second layer of a photochromic polymeric material capable of switching between purple and transparent states, and a green substrate was fabricated, as shown in FIG. 3. The liquid crystal material was fabricated under the process described in U.S. Pat. No. 6,824,708 to Iftime et al. The polymeric photochromic layer was deposed on a Mylar™ sheet by a doctor-blade technique from a THF solution of Polymethylmethacrylate/spiropyran. Layers were switched independently and three different colors were displayed. The states after switching were stable (i.e., no power was required to maintain them).

Figure 4:
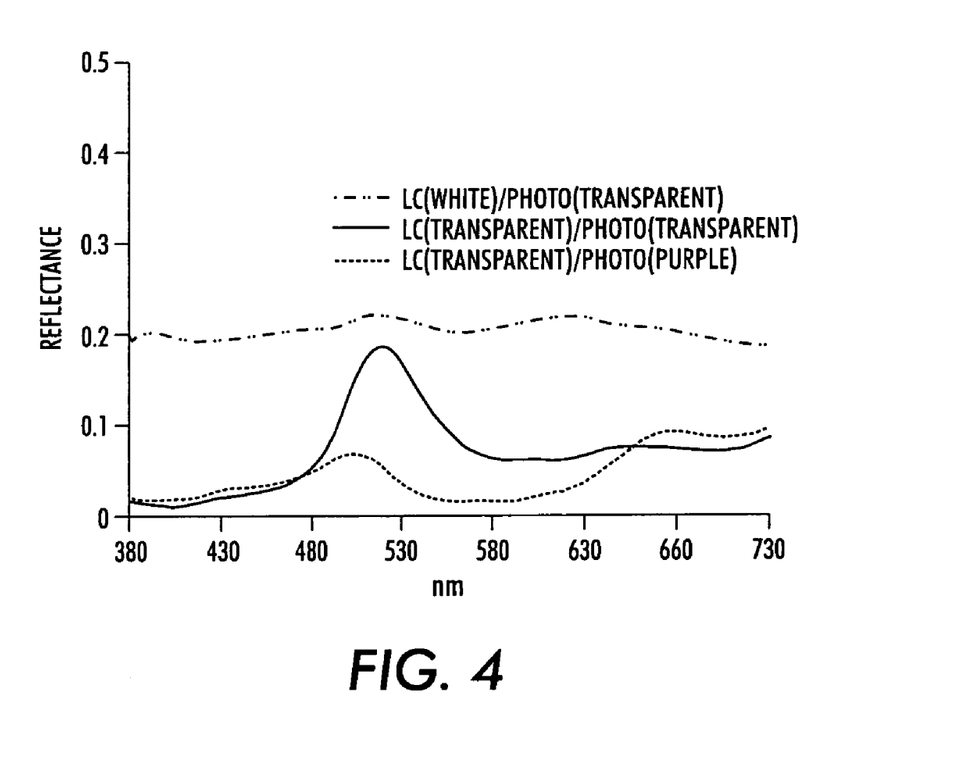
FIG. 4 depicts a reflectance spectra graph for the reimagable media of FIG. 3.

The reflectance spectra for the three states are shown in FIG. 4. Line 410 displays the reflectivity measured when the liquid crystal layer was switched to its white state. Line 420 displays the reflectivity measured when the photochromic layer and the liquid crystal layer were both switched to their transparent states. Line 430 displays the reflectivity measured when the liquid crystal layer was switched to its transparent state and the polymeric photochromic layer was switched to its purple state.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A reimagable medium, comprising:
   a first photochromic layer;
   a liquid crystal layer adjacent to the first photochromic layer, wherein the liquid crystal layer includes a liquid crystal composition;
   a second photochromic layer adjacent to the liquid crystal layer; and
   an electric field generating apparatus connected across the liquid crystal layer, wherein the electric field generating apparatus supplies a voltage across the liquid crystal layer.

2. The reimagable medium of claim 1 wherein the first photochromic layer comprises a photochromic material, wherein the photochromic material displays a color after being irradiated by light having a first wavelength, wherein the photochromic material becomes transparent after being irradiated by light having a second wavelength.

3. The reimagable medium of claim 2 wherein the photochromic material comprises one or more of the following: spiropyran compounds; stilbenes; azo compounds; chromenes; bisimidazoles; spirodihydroindolizines, tetrahydroindolizines; hexahydroindolizines; quinines; perimidinespirocyclohexadienones; viologens; fulgides; fulgimides; diarylethenes; triarylmethanes; and anils.

4. The reimagable medium of claim 2 wherein the first wavelength is between about 200 nm and about 475 nm.

5. The reimagable medium of claim 2 wherein the second wavelength is within the visible spectrum.

6. The reimagable medium of claim 1 wherein the second photochromic layer comprises a photochromic material, wherein the photochromic material displays a color after being irradiated by light having a first wavelength, wherein the photochromic material becomes transparent after being irradiated by light having a second wavelength.

7. The reimagable medium of claim 6 wherein the photochromic material comprises one or more of the following: spiropyran compounds; stilbenes; azo compounds; chromenes; bisimidazoles; spirodihydroindolizines, tetrahydroindolizines; hexahydroindolizines; quinines; perimidinespirocyclohexadienones; viologens; fulgides; fulgimides; diarylethenes; triarylmethanes; and anils.

8. The reimagable medium of claim 6 wherein the first wavelength is between about 200 nm and about 475 nm.

9. The reimagable medium of claim 6 wherein the second wavelength is within the visible spectrum.

10. The reimagable medium of claim 1 wherein the liquid crystal layer displays a color when the electric field generating apparatus supplies a first voltage, wherein the liquid crystal layer becomes transparent when the electric field generating apparatus supplies a second voltage.

11. The reimagable medium of claim 10 wherein the color is white.

12. The reimagable medium of claim 1 wherein the liquid crystal composition comprises:
    a liquid crystal;
    a liquid crystal domain stabilizing compound; and
    a dispersant.

13. The reimagable medium of claim 1 wherein the liquid crystal composition is switchable between a strongly scattering state of a first plurality of smaller liquid crystal domains that strongly scatters a predetermined light and a weakly scattering state of a second plurality of larger liquid crystal domains that weakly scatters the predetermined light.

14. The reimagable medium of claim 1 wherein the first photochromic layer, the liquid crystal layer, and the second photochromic layer are flexible.

15. The reimagable medium of claim 1, further comprising:
    a substrate having a color, wherein the substrate is removably attached to the second photochromic layer.

16. A method of forming an image on a reimagable medium having a first photochromic layer, a liquid crystal layer, a second photochromic layer and an electric field generating apparatus, the method comprising:
    supplying, via the electric field generating apparatus, a first voltage across the liquid crystal layer causing the liquid crystal layer to transfer to a first colored state; and
    irradiating at least a portion of the first photochromic layer with light having a first wavelength causing the irradiated portion of the first photochromic layer to transfer to a second colored state.

17. The method of claim 16, further comprising:
    irradiating at least a portion of the second photochromic layer with light having a second wavelength causing the irradiated portion of the second photochromic layer to transfer to a third colored state.

18. The method of claim 16, further comprising:
    supplying, via the electric field generating apparatus, a second voltage across the liquid crystal layer causing the liquid crystal layer to transfer to a transparent state.

19. The method of claim 16, further comprising:
    removably attaching a substrate having a color to the second photochromic layer.

* * * * *